Sept. 27, 1932.  L. B. JOHNSON  1,879,290
LOCK NUT AND BOLT
Filed June 17, 1931

L. B. Johnson,
Inventor

By Ralph B Burch
Attorney

Patented Sept. 27, 1932

1,879,290

UNITED STATES PATENT OFFICE

LAURANCE BENTON JOHNSON, OF SPRUCE LAKE, SASKATCHEWAN, CANADA

LOCK NUT AND BOLT

Application filed June 17, 1931. Serial No. 545,105.

This invention relates to improvements in a lock nut and bolt. Its primary object being to provide a locking device for a nut in combination with a grooved bolt.

A further object is to provide such a lock nut and bolt that may be unlocked and the nut removed from the bolt without damaging either the nut, bolt, or the locking device.

With these and other objects in view that may appear while the description proceeds, the invention consists in the novel construction and arrangement of parts as hereinafter more specifically set forth claimed and shown in the accompanying drawing forming a part of this specification and in which;

Figure 1:
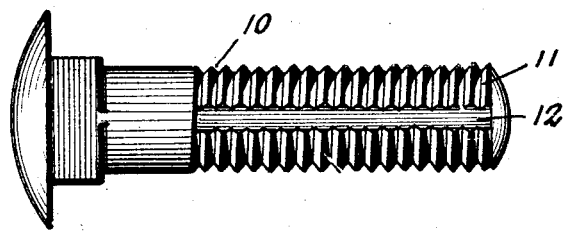
Fig. 1 is a view of the bolt to be used in combination with the nut and locking device.
Figure 2:
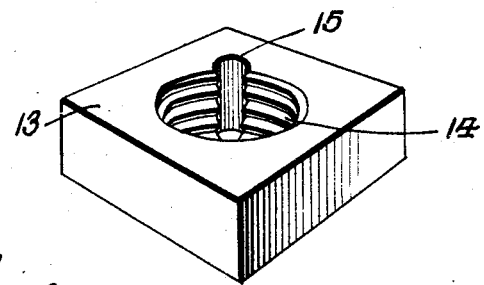
Fig. 2 is a perspective view of the nut.
Figure 3:
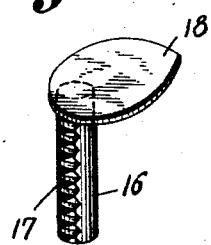
Fig. 3 is a perspective view of the locking device.

Referring more in detail to the drawing in which similar reference characters designate corresponding parts throughout the several views, it will be seen that the invention comprises a bolt 10 which may be of any particular design having a machined thread 11. Along the bolt 10 is a groove 12 which is engaged by the locking device. The nut 13 has threaded central orifice 14 and a smaller circular orifice 15 located in such a position that the circumference of the central orifice 14 and the circumference of the smaller orifice meet each other in such a manner that the holes are conjoined together. The locking device consists of a circular member 16 being threaded for a part of its circumference only as shown at 17. It is to be understood that the thread extends the entire length of the member 16. At one end of this member 16 is heart shaped member 18 secured thereto.

Figure 4:
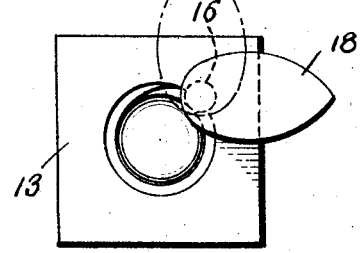
Fig. 4 shows the locking device when placed in position on the nut.
Figure 5:
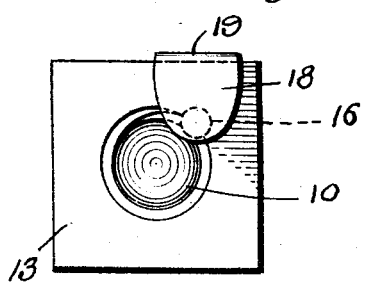
Fig. 5 is a similar view with the locking device in the "locked" position.

When the nut is in place on the bolt the locking device is put in place as shown in Fig. 4. The member 16 being inserted in the orifice 15. Its outer circumference extending into the central orifice 14 in such a manner that the threaded portion 17 will engage the thread 11 of the bolt 10 while being tightened. When the nut is tightened into place the locking device is brought into alignment with the groove 12. The member 18 is then turned to the position shown in Fig. 5. This brings the unthreaded part of the member 16 into the groove 12 and prevents the nut from being turned. The member 18 is then bent down over the edge of the nut as shown at 19. To remove the nut the operation is reversed.

It is believed that the construction and advantages of the structure shown may be apparent from the foregoing paragraphs taken in connection with the accompanying drawing without further detailed description.

While the preferred embodiment of the invention has been disclosed it is understood that minor changes in the details of construction, combination and arrangement of cooperating elements may be resorted to within the scope of what is claimed without departing from the spirit of the invention.

I claim:

In a lock nut and bolt, a threaded bolt having a longitudinal groove, a nut having a main threaded orifice to receive said bolt and a smaller orific parallel to and communicating with said main orifice, a circular locking member rotatably mounted in said smaller orifice, having fragmentary threads on one side thereof, adapted to aline with the threads of the main orifice when said locking member is in a non-locking position, a flat plate extending at right angles from the upper end of said locking member, adapted to turn said member to bring the smooth surface of said member into locking engagement with the groove of said bolt, said plate extending beyond the edge of said nut and adapted to be bent over the edge of said nut to secure said locking member in locked position.

In testimony whereof I affix my signature.

L. B. JOHNSON.